Sept. 15, 1953     R. CANTU     2,652,074
WIRE BENDING AND COILING TOOL
Filed Sept. 18, 1952
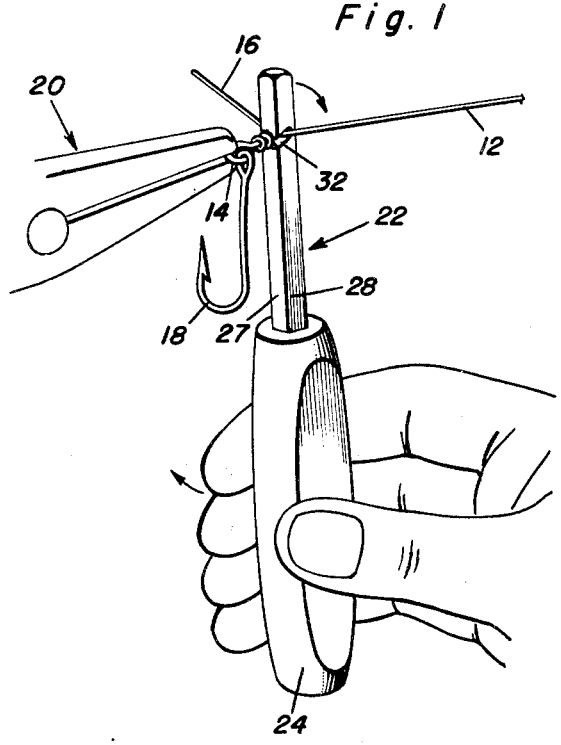
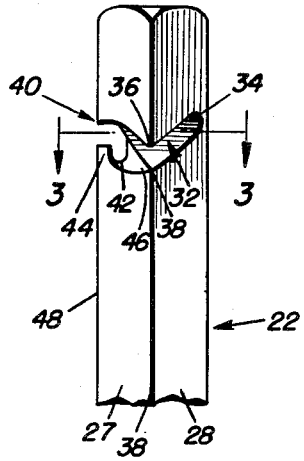
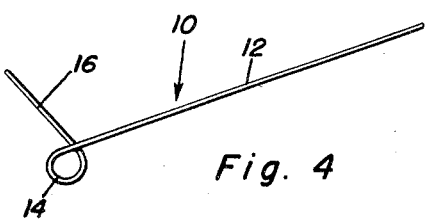
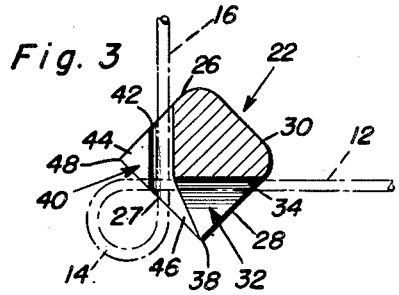
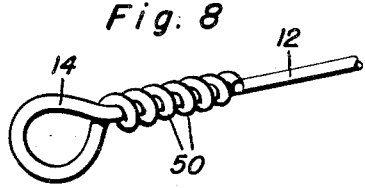
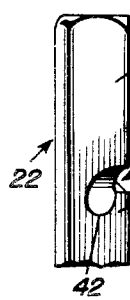  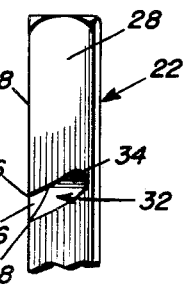
Rudolph Cantu
INVENTOR.

UNITED STATES PATENT OFFICE 2,652,074

WIRE BENDING AND COILING TOOL

Rudolph Cantu, Lyford, Tex.

Application September 18, 1952, Serial No. 310,234

2 Claims. (Cl. 140—124)

The present invention relates to certain new and useful improvements in hand tools for bending, coiling and wrapping one end of a length of wire around the adjacent portion of the other end of the wire for purposes of forming a permanent loop or eye, and has more particular reference to a tool which is expressly, but not necessarily, adapted to be used by a fisherman in attaching a fishing hook to the thus formed eye.

It is within the purview of the present inventive concept to construct these tools of varying sizes so that they may be used for coiling wire fencing, electric current conducting wires and so on. However, the tool is primarily designed and thus especially adapted for use in fashioning one end of a piano wire into a loop or eye, whereby the finished article may be used as fishing line leader.

It is, of course, a matter of common knowledge that many and varied forms and styles of wire looping and coiling tools and implements have been devised by others to achieve the same results as is herein accomplished. It follows, therefore, that an object of the instant invention is to structurally, functionally and otherwise improve upon similarly constructed and performing tools and in doing so, to provide one which is characterized by highly desirable, easy-to-use facilities and to thus fulfill the requirements and needs of manufacturers and the users alike.

Briefly and broadly, a preferred embodiment of the invention is characterized by a handle-equipped rigid shank, the latter provided with a first notch opening through one face of the shank and further provided with a second notch opening through an adjacent face of the shank, the inner closed end of each notch forming a wire seat and said seats being at right angles to each other.

More explicitly, the desired results and achievements are attained through the medium of a simple, practical and economical hand tool comprising a shank having a handle at one end of the shank, said shank being rectangular in cross-section and being provided with a first notch which is generally V-shaped and obliquely inclined relative to the longitudinal axis of the shank, said notch providing a wire seat at its inner closed end and also providing companion triangular jaws defining an entrance mouth registering with and opening through one corner forming edge of the shank, said shank having a second notch disposed at right angles to the axes of said shank and defining a mouth registering with and opening through an adjacent corner forming edge of the shank, the closed inner end of said second notch providing a wire seat which is undercut and assumes a position at right angles to said first named seat, and a groove formed in that face of the shank which is between said corners, said groove leading to and communicatively registering with the entrance mouth of said first notch.

Other objects, features and advantages will become more readily apparent from the following description and the accompanying sheet of illustrative drawings.

In the accompanying sheet of drawings wherein like numerals are employed to designate like parts throughout the views:

Figure 1 is a perspective view illustrating a tool constructed in accordance with the principles of the invention, and showing the manner in which the same is used.

Figure 2 is an enlarged fragmentary elevational view of the featured improvement; namely, the novel wire holding, coiling and wrapping facilities.

Figure 3 is a horizontal section on the plane of the line 3—3 of Figure 1 looking in the direction of the arrows.

Figure 4 is a perspective view showing the manner in which the wire is initially bent before the improved tool is engaged therewith, as is evident from the dotted lines showing in Figure 3.

Figure 5 is a fragmentary elevational view on a scale smaller than that appearing in Figure 2 and showing one side of the shank and one notch.

Figure 6 is a similar view of another side of face, and

Figure 7 is a similar view of another side, all based on Figure 2.

Figure 8 is a perspective view of the finished wire.

In the drawings, in Figure 4 the wire which is to be bent and coiled is denoted by the numeral 10. Assuming that this is to be a fishing line leader, the wire will be, as usual, a so-called length of piano wire, one end portion, which is denoted at 12, representing here what is called the shaft portion. The wire is bent with pliers or the like between its ends to form a loop 14 and the bendable end of the wire is denoted at 16, this being the end which is to be coiled and wrapped. The fishing hook 18 is, of course, attached before the wrapping step is started. The numeral 20 designates a pair of pliers.

The tool comprises a shank 22 of rigid metal having a suitable hand grip or handle 24 secured to one end. The shank is rectangular in cross-section and the flat faces are denoted for convenience of description by the numerals 26, 27, 28 and 30. The first notch, which is V-shaped, is denoted by the numeral 32. This is disposed at an oblique angle in respect to the longitudinal axis in the shank in order that it will have the desired slant and the inner closed end 34 is rounded to provide a seat for the shaft portion 12 of the wire. The notch defines a pair of upper and lower triangular jaws 36 and 38 whose vertices open through the corner forming edge 38 to provide an entrance mouth for the wire-end 12. The second notch, which is essential in a plane at right angles to the axis of the shank, is denoted by the numeral 40, and the inner closed end of this is fashioned into a seat which is undercut, as at 42, to define not only a seat, but a projecting guiding and bending finger 44. The seat 42 is in a plane below or out of line with the seat 34. Then, there is a junctural connecting groove 46 which is formed in that face 27 between the corner 38 and the adjacent edge or corner 48. The notch 40 opens through the corner 48, and the finger 44 is approximately triangular in plan as well as cross-section as is evidenced from Figure 3. This figure shows how the groove 46 joins up with the mouth of first named notch, so that the two notches are communicatively connected. The notches are thus shaped and arranged for companionate cooperation and to facilitate the simultaneous insertion of the wire ends 12 and 16. Obviously, and in practice, the jaws 36, 38 function as adapters and they embrace the wire end 12, and the latter then serves as a sort of a journal or mandrel around which the tool is turned in a rotary manner as shown by the arrows in Figure 1. Therefore, the notch 32 has jaws 36 and 38 to provide the holding means. The second notch 40 and its finger 44 and seat 42 accommodate the wire end 16 and permit the same to be coiled and thus wrapped around the wire end 12 in an obvious manner. In doing this, the previously formed eye 14 is held between the jaws of the pliers 20 in the manner shown. It follows, therefore, that the piece of wire as shown in Figure 4 is placed in the respective notches and properly seated as shown in dotted lines in Figure 3. Then the tool is operated as illustrated in Figure 1 and the resultant product is that shown in Figure 8, wherein the coils are denoted by the numeral 50.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. A wire bending, coiling and coil-wrapping hand tool comprising a shank having a handle at one end of the shank, said shank being rectangular in cross-section and being provided with a first notch which is generally V-shaped and obliquely inclined relative to the longitudinal axis of the shank, said notch providing a wire seat at its inner closed end and also providing companion triangular jaws defining an entrance mouth registering with and opening through one corner forming edge of the shank, said shank having a second notch disposed at right angles to the axis of said shank and defining a mouth registering with and opening through an adjacent corner forming edge of the shank, the closed inner end of said second notch providing a wire seat which is undercut and assumes a position at right angles to said first named seat, and a groove formed in that face of the shank which is between said corners, said groove leading to and communicatively registering with the entrance mouth of said first notch.

2. A wire bending and coiling tool adapted to form a permanent loop at one end of a length or wire comprising a shank having a handle, said shank being provided with a substantially V-shaped notch opening through one face of the shank, said notch being oblique and thus inclined in respect to the longitudinal axis of the shank, said notch providing a seat at its inner closed end and also defining a pair of triangular jaws to embrace and rotate about the shaft portion of the wire, said shank also being provided with a second notch opening through a face of the shank adjacent to said first named face and being in communication with said first notch, the inner closed end of said second notch defining a wire seat which is at right angles to said first named seat, and further defining a wire retaining and bending finger, said seats being in different planes and the vertices of said jaws serving to provide an entrance mouth for said first notch which is substantially coplanar with the seat in the second notch, the bottom of said second notch being undercut and including a lateral groove communicating with the mouth of the first notch and serving to permit the complemental right angularly disposed portions of the wire to unobstructedly and simultaneously pilot themselves into both notches.

RUDOLPH CANTU.

References Cited in the file of this patent

UNITED STATES PATENTS

| Number | Name | Date |
| --- | --- | --- |
| 1,151,639 | Whitworth | Aug. 31, 1915 |
| 1,303,788 | Gannon | May 13, 1919 |
| 1,871,029 | Boese | Aug. 9, 1932 |